(12) United States Patent
Van Der Kall et al.

(10) Patent No.: US 7,440,000 B2
(45) Date of Patent: Oct. 21, 2008

(54) METHOD AND APPARATUS FOR FORMING A LABEL

(75) Inventors: Herman Van Der Kall, Eindhoven (NL); Joop Van Bijnen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 68 days.

(21) Appl. No.: 11/571,530

(22) PCT Filed: Jun. 30, 2005

(86) PCT No.: PCT/IB2005/052177

§ 371 (c)(1),
(2), (4) Date: Jan. 2, 2007

(87) PCT Pub. No.: WO2006/006102

PCT Pub. Date: Jan. 19, 2006

(65) Prior Publication Data

US 2007/0157838 A1    Jul. 12, 2007

(30) Foreign Application Priority Data

Jul. 5, 2004   (EP) .................................. 04103163

(51) Int. Cl.
*G11B 7/0045* (2006.01)
*G11B 19/28* (2006.01)
(52) U.S. Cl. ...................................... 347/248; 347/234
(58) Field of Classification Search ................. 347/248, 347/234
See application file for complete search history.

(56) References Cited

U.S. PATENT DOCUMENTS

| 6,020,977 | A | 2/2000 | Kim |
| 6,264,295 | B1 | 7/2001 | Bradshaw et al. |
| 6,424,147 | B1 * | 7/2002 | Kato et al. ............... 324/207.2 |
| 6,590,843 | B1 | 7/2003 | Zhuang |

(Continued)

FOREIGN PATENT DOCUMENTS

EP        1093993        4/2001

(Continued)

OTHER PUBLICATIONS

ISR/Written Opinion of the International Searching Authority PCT/IB2005/052177.

*Primary Examiner*—Huan H Tran
(74) *Attorney, Agent, or Firm*—Michael E. Belk (57) ABSTRACT

In an optical disc drive, adapted for forming a label on the label side 14 of a recordable optical disc 10, a determination of the rotation angle a is provided, so that the marking of the label side 14 can be synchronized upon. The method to determine the rotation angle a is based upon one or two of the signals 17', 18', 19' generated by the Hall-effect elements 17, 18, 19 which are normally present in an optical disc drive and are used to generate the tacho signal 24. Advantageously, the actual relationship between rotation angle a and the amplitude of these signals is recorded in a calibration procedure, so as to allow for a higher precision of the rotation angle a determined. This calibration procedure may be performed in the factory or by the user, and may not require any additional ad-hoc equipment if a synchronization pattern present in an optical disc is used.

12 Claims, 4 Drawing Sheets

U.S. PATENT DOCUMENTS

| | | |
|---|---|---|
| 2003/0080732 A1 | 5/2003 | Okazaki et al. |
| 2003/0107959 A1 | 6/2003 | Norton et al. |
| 2003/0161224 A1 | 8/2003 | Anderson et al. |
| 2003/0193864 A1 | 10/2003 | Pate et al. |

FOREIGN PATENT DOCUMENTS

| | | |
|---|---|---|
| EP | 1367570 | 12/2003 |
| WO | 9847137 | 10/1998 |

* cited by examiner

METHOD AND APPARATUS FOR FORMING A LABEL

The invention relates to a method for forming a label on a label side of an optical information carrier.

The invention further relates to an apparatus for forming a label on a label side of an optical information carrier.

An embodiment of the apparatus for forming a label on the label side of an optical information carrier is known from US 2003/0161224A1, which discloses a recordable optical disc and an optical disc drive for recording the recordable optical disc. The recordable optical disc has a data side and a label side comprising a writable label layer, which for example includes a material that can be visibly altered by applying a thermal energy to it. Accordingly, the optical disc drive is provided with a writing means which can be controlled to write on the label side, i.e. forming a label, by applying the thermal energy necessary to visibly alter the writable label layer. The writing means may be distinct from the writing means which is used to record user-data on the data side, and it may be located on the opposite side in respect with the disc, so that the label side can be formed at the same time when the user-data are recorded. The writing means is controlled to write, while rotating the optical disc, so as to enable the formation of a label, comprising for example text or images.

In another situation however the writing mechanism may be the same writing mechanism which is also used to record user-data on the data side. This implies that the recording of user-data and the formation of the label will have to take place as two different subsequent actions. Also in this case the writing mechanism needs to be controlled to write, while rotating the optical disc.

Writing on the label side however has different implications according to whether at the same time user-data are being recorded or not. In fact while recording user-data on the data side, the actual position where the writing mechanism is being writing can be derived from position information present in a groove which is being scanned and where user-data are being recorded. In contrast, on the label side no groove containing information on the actual position is present. US 2003/0161224A1 is silent on how such actual position can be determined while writing on the label side as a separate action. The known apparatus therefore has the disadvantage that is not capable of forming a label when the writing mechanism is the same, or more in general facing the same side of the disc, as the writing mechanism which is used to record user-data.

It is a first object of the invention to provide a method for forming a label on the label side of an optical information carrier, with which method the label can be formed in a relatively wide variety of situations.

It is a second object of the invention to provide an apparatus for forming a label on the label side of an optical information carrier, with which apparatus the label can be formed in a relatively wide variety of situations.

According to the invention, the first object is achieved by a method as claimed in claim 1.

The invention is based on the recognitions exposed below.

First, in order to form a label on the label side of the optical information carrier, the writing means need to be controlled in dependency of the actual position of the label side, i.e. the position of the label side which the writing means would mark at a given moment if activated, and which varies as result of the rotation of the optical information carrier.

Second, a position on the optical information carrier can be seen as consisting of a rotation angle and a radial position. In an apparatus for accessing an optical information carrier, herein referred to as optical disc drive, the radial position is usually available. The same applies to an optical disc drive adapted for forming a label on the label side of an optical information carrier, and thus the knowledge of the rotation angle, and a method for the determination thereof, allow for the determination of the actual position of the label side.

Third, a parameter which varies in dependency of the rotation angle is normally present in existing optical disc drives, though it is not used for determining the rotation angle, and therefore the method according to the invention can advantageously be applied in such optical disc drives without requiring the addition of new components but with relatively minor adaptations of the existing ones.

As it can be noticed, in fact, in existing optical disc drives the optical information carrier is rotated by engaging it with a turntable motor, so as to be arranged substantially coaxially, and by rotating the turntable motor, the optical information carrier being rotated in unison with the turntable motor as a result. The rotation speed of the turntable motor is usually controlled by use of a signal, called tacho signal, having rectangular pulses at a frequency proportional to the rotation speed. The tacho signal per se does not contain any information about the rotation angle at a given moment. However the tacho signal is derived from the processing of at least one other signal, often three other signals, the amplitude of which other signal varies cyclically and continuously upon rotation of the turntable motor, thus in dependence of the rotation angle. This other signal, called hereinafter angle-dependent signal, is normally generated by a Hall-effect sensor, which is rotatable relative to a magnetic field upon rotation of the turntable motor, although other implementations are possible. Normally, the magnetic field is generated by the magnet which is the rotor of the turntable motor, whereas the Hall-effect sensor is disposed at a fixed position, i.e. mounted on a non-rotating part, so as to be variably subjected to the magnetic field. In this way an angle-dependent signal is generated, the amplitude of which reflects the rotation angle of the Hall-effect sensor relative to the magnet, and thus the rotation angle of the optical information carrier which is rotating together with it.

Therefore the amplitude of an angle-dependent signal such as the one described above generated by a Hall-effect sensor may be used as the parameter which varies continuously in dependency of the rotation angle.

The method according to the invention provides a determination of the rotation angle, and therefore enables the formation of a label even when the formation of the label takes place as a separate action from the recording of user data, which is the case for example when the writing means are the same, or more in general facing the same side of the optical information carrier, as the head which is used to record user-data. The method according to the invention however can advantageously applied even when the formation of the label takes place concomitantly to the recording of user data, since the rotation angle can be determined without a conversion from the address information being involved.

The method according to the invention, as mentioned above, has the further advantage that it can be applied in an existing optical disc drive implying a relatively small modification of the optical disc drive itself.

In an alternative solution, according to the invention, the first object is achieved by a method as claimed in claim 2. In this case the determination of the rotation angle is used for regulating the rotation speed imposed to the information carrier by the turntable motor. In this way it is possible to achieve a regulation of the rotation speed which, particularly at low speeds, is much more accurate and reliable than the regulation based on the tacho signal, and can be assumed to be equal to an imposed value. According to this method, the modulating the power of the writing means does not need to be directly dependent on the rotation angle determined, but can be simply dependent on time, because the rotation speed can be regulated with a sufficient accuracy, and thus can be assumed to be equal to an imposed value, which is known. In this context by sufficient accuracy is meant an accuracy such that a label so formed has a good visual definition.

In particular, the rotation speed regulated can be a constant rotation speed, also knows as constant angular velocity, as claimed in claim 3.

The relationship between the parameter and the rotation angle referred to in the method according to the invention can be theoretically derived based on formulas describing electromagnetic phenomena. If a Hall-effect sensor is used to generate the angle-dependent signal, this angle-dependent signal may have a sinusoidal shape when its amplitude vs. rotation angle is represented in a graph.

Inventors however have recognized how the relationship between the parameter, i.e. the amplitude of the angle-dependent signal generated by the Hall-effect sensor, and the rotation angle can deviate significantly from the theoretically derived sinusoid. The actual relationship, and the consequent deviation from the theoretically derived sinusoid, can be different from Hall sensor to Hall sensor, and, for the same Hall sensor can vary in dependency on the magnet to which the Hall sensor is coupled, besides on the exact position on which it is mounted. As a consequence, if a theoretically derived relationship is used, a systematic error will be introduced in the determination of the rotation angle.

In order to overcome this problem, in a particularly advantageous embodiment the method according to the invention has the features of claim 4.

According to this embodiment, in a preliminary step of the method, the actual relationship between the parameter and the rotation angle is experimentally constructed. As a consequence the determination of the rotation angle can be made more reliable and precise and therefore allow for a better definition and quality of an image to be formed on the label side. This preliminary step can be performed every time a label is going to be formed, however, since the actual relationship between the parameter and the rotation angle primarily depends on the Hall sensor, on the magnet, and on the coupling between the two, this preliminary step can also be performed once for all, after which the experimentally constructed relationship is used each time the rotation angle is determined.

Several ways can be envisaged in order to carry out the reference measurement of the rotation angle, for example by use of additional hardware in the optical disc drive, or by use of an ad hoc external equipment to which the drive needs to be coupled only for the preliminary step, like for example an angular encoder, and which yields the reference measurement. Advantageously, the reference measurement can be carried out with a method as claimed in claim 5.

In this case an optical information carrier having a synchronization pattern is used, for example a CD-R, the synchronization pattern being a radial wobble modulation of the spiral track. The wobble signal, which is generated from the wobble modulation while the track is being scanned, has a frequency which depends on the nominal wavelength of the wobble modulation and on the scanning linear speed: therefore by measuring this frequency it is possible to measure the linear speed, which speed can be integrated and translated into an angle information.

According to this embodiment therefore the preliminary step can be carried out without the use of additional hardware or external equipment coupled to the drive.

While it is principle possible to determine the rotation angle on the basis of a single parameter, the use of at least one additional parameter, as claimed in claim 6, allows for both a simplification of the calculation needed and for a more reliable and precise determination.

The second object of the invention is achieved by an apparatus for forming a label on the label side of an optical information carrier as claimed in claim 8 or 9, as it will appear clear from the foregoing discussion. Advantageous embodiments of the apparatus according to the invention are claimed in claims 10, 11 and 12.

These and other aspects of the method and apparatus according to the invention will be further elucidated and described with reference to the drawings. In the drawings.

Figure 1:
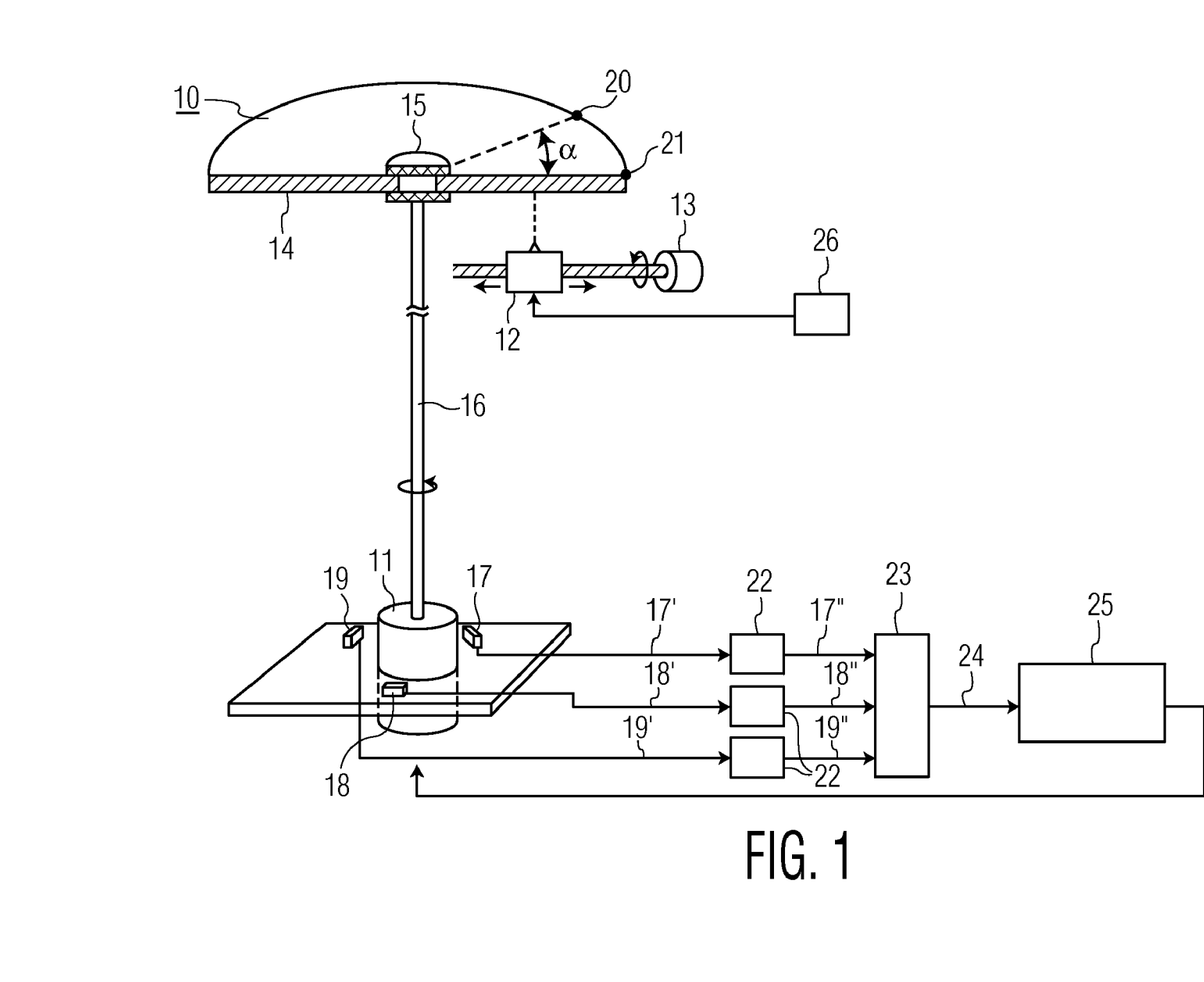
FIG. 1 shows an optical disc drive adapted for the formation of a label known from the prior art.

FIG. 1 shows an optical disc drive adapted for the formation of a label known from the prior art. An optical information carrier 10, having a label side 14, is clamped with clamping means 15 to a shaft 16 elongating from the turntable motor 11 so as to be arranged substantially coaxially with the rotation axis of the turntable motor 11. As a consequence the optical information carrier 10 is engaged by the turntable motor 11, and thus can be rotated in unison with it. The optical information carrier 10 is disposed so as to have the label side 14 facing writing means 12 for marking the label side 14, radially positionable by radial positioning means 13. Power modulation means 26 are present for modulating the power of the writing means 12 while rotating the optical information carrier 10.

The magnet, which is the rotor of the turntable motor 11, not shown in the figure, generates a magnetic field which is cyclically varying upon rotation of the turntable motor 11.

Three Hall-effect sensors 17, 18, 19 are disposed at fixed positions, at equal intervals along a circle around the axis of rotation, and so as to be subjected to the magnetic field. The Hall-effect sensors 17, 18, 19 produce respective electrical signals 17', 18', 19', which amplitude is approximately proportional to the intensity of the magnetic field to which the respective Hall-effect sensors is subjected.

Since the magnetic field variates upon rotation of the turntable motor 11, also the electrical signals 17', 18', 19' output by the Hall-effect sensors 17, 18, 19 are varying cyclically upon rotation of the turntable motor 11, therefore representing parameters which vary continuously in dependency of a rotation angle α. The rotation angle α can be defined as the angle comprised between a reference point 20 of the optical information carrier 10 and a fixed reference position 21 of the reference point 20. These angle-dependent signals 17', 18', 19' are processed by first signal processing units 22 so as to obtain as many commuting signals 17", 18", 19", which are commuting between two electrical values at instants when the actual value of the respective angle-dependent signal 17', 18', 19' crosses a threshold value. The three commuting signal 17", 18", 19" so obtained are then combined by a second signal processing unit 23 in a further commuting signal, known in the art as tacho signal 24, having a commutation each time anyone of the three commuting signals 17", 18", 19" has a commutation. The tacho signal 24 presents pulses at a frequency which is proportional to the rotational speed, and is used by a speed control unit 25 to regulate the rotation speed of the turntable motor 11.

The apparatus is also provided with a head for performing both reading and writing accesses. This head may be distinct from the writing means 12 and may be positionable by additional radial positioning means distinct from the radial positioning means 13. The head and the additional radial positioning means may be located on the opposite side or the same side in respect of the optical information carrier 10 as the writing means 12. As an alternative the head and the writing means 12 may be distinct but positionable by the same positioning means 13. Furthermore, the head and the writing means 12 may be fully integral, i.e. the same device is used for reading or recording data on the data side and for marking the label side 14.

Although the invention is being explained with reference to an optical disc drive, i.e. an apparatus for accessing an optical information carrier, adapted for the formation of a label, the invention can also be applied to an apparatus which is specifically for the formation of a label; the parts shown in FIG. 1 may be referred to such an apparatus as well.

Figure 2:
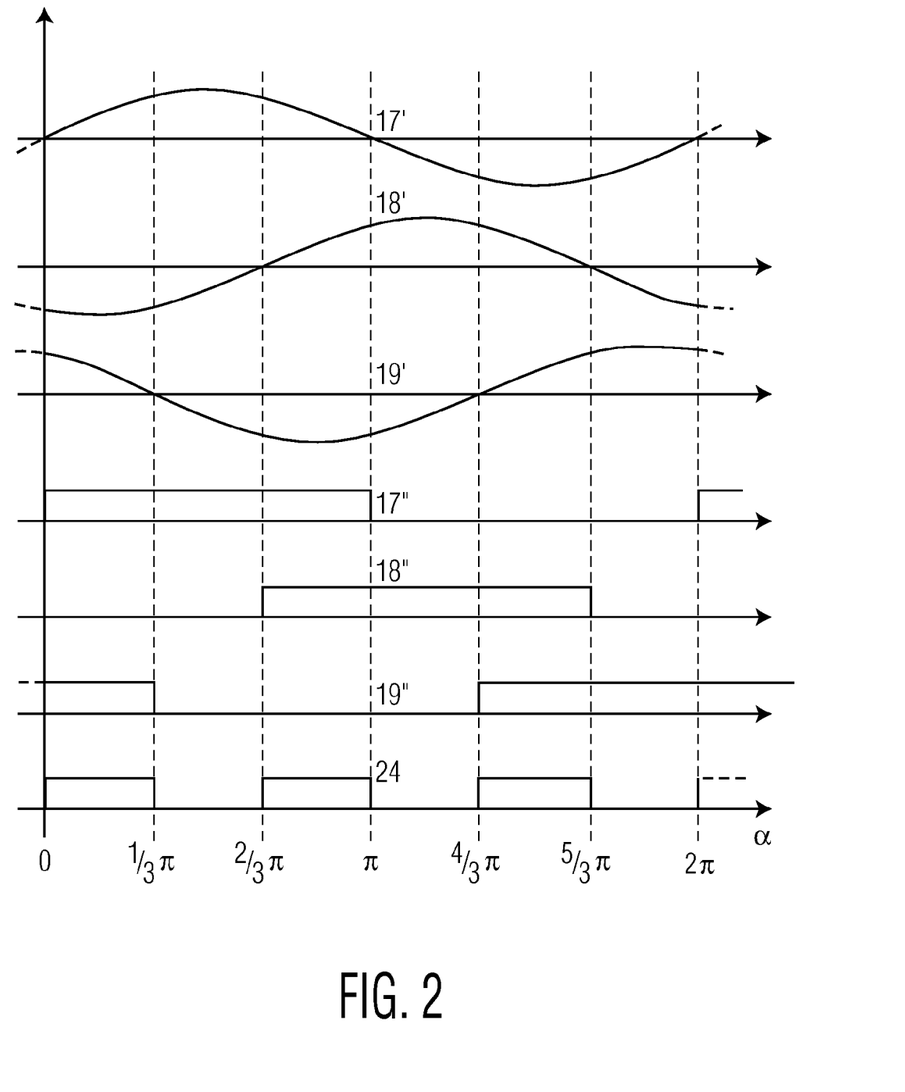
FIG. 2 shows in detail signals present in the optical disc drive shown in FIG. 1.

FIG. 2 shows in detail signals present in the optical disc drive shown in FIG. 1, in particular the three angle dependent signals 17', 18', 19' which are output by the respective Hall-effect sensors 17, 18, 19, the respective commuting signals 17", 18", 19" and the tacho signal 24.

Figure 3:
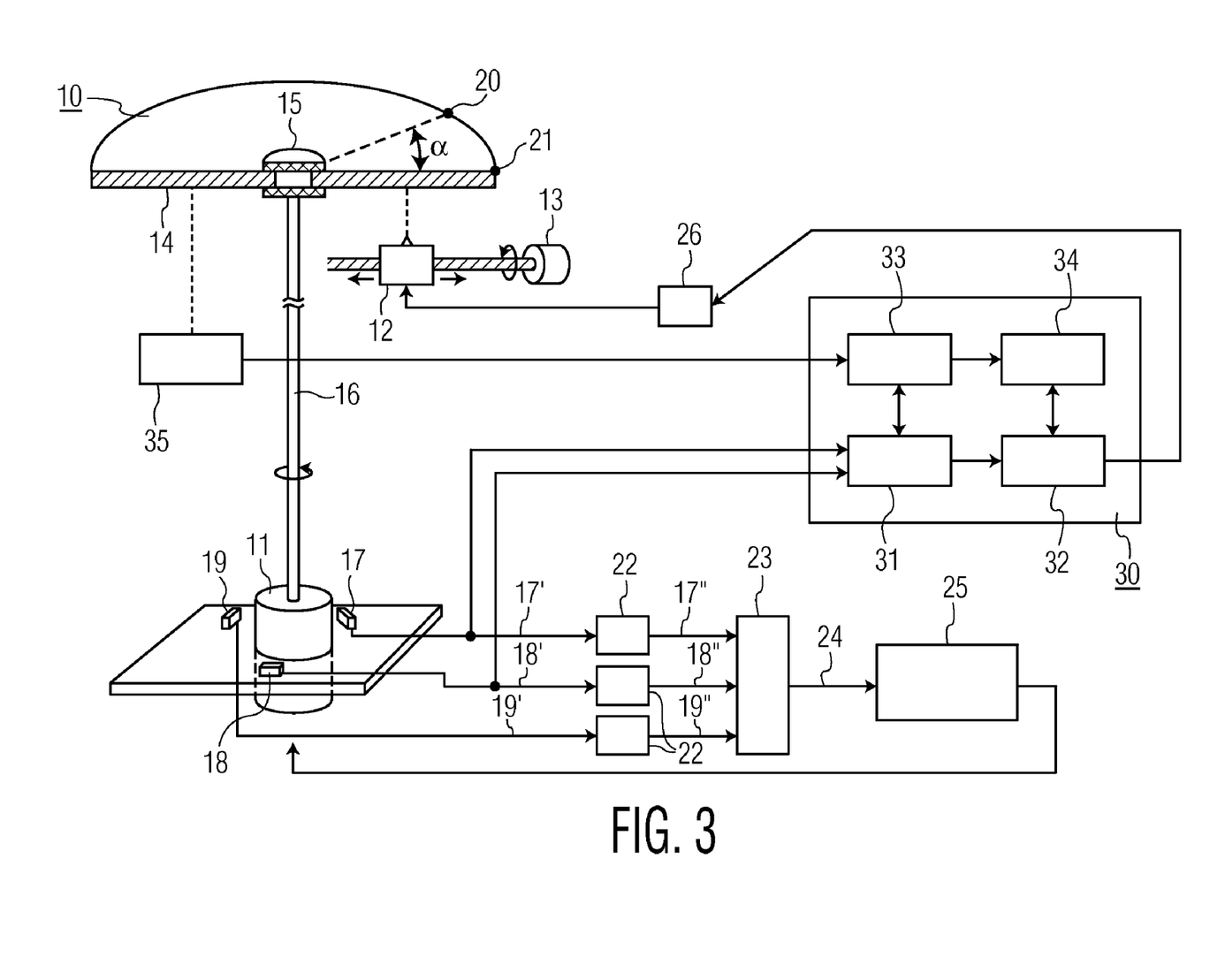
FIG. 3 shows a first embodiment of an apparatus for forming a label on a label side of an optical information carrier according to the invention.

FIG. 3 shows a first embodiment of an apparatus for forming a label on the label side 14 of an optical information carrier 10 according to the invention. In addition to the features already shown in FIG. 1, an angle determination unit 30 for determining the rotation angle a of the optical information carrier 10 is present. Two of the angle-dependent signals 17', 18' are derived to measuring means 31, present in the angle determination unit 30, where their actual amplitude is measured. This measurement is provided to calculation means 32, which calculate the rotation angle a upon the measurement provided, by using a relationship between the amplitudes measured and the rotation angle $\alpha$. The determination of the rotation angle $\alpha$ is possible even upon the measurement of a single angle-dependent signal 17': the possible ambiguity in the rotation angle $\alpha$ corresponding to an amplitude of the angle-dependent signal 17' may be resolved for example by looking at if the trend of the angle-dependent signal 17' is increasing or decreasing at the moment when the measurement is taken. The acquisition of two signals however simplifies the determination and allows reducing the effect of noise. The use of all three the signals 17', 18', 19' is also possible. The rotation angle $\alpha$ determined is provided to power modulation means, which modulate the power of the writing means 12 accordingly.

It is interesting to remark that the commuting signals 17", 18", 19" or the tacho signal 25 could not be used for this purpose, because these are not continuously varying signals but signal commuting between two electrical levels, therefore in general an actual value of any of these signals cannot be associated to a specific rotation angle $\alpha$, but rather to a range of rotation angles.

It is similarly interesting to remark that while the rotation angle $\alpha$ can in principle be determined by integrating the rotational speed, which rotational speed is known from the tacho signal 24, as it has been explained with reference to FIG. 1: such a determination however would inevitably be affected by an error which would grow during the revolutions of the disc, with the result of making the determination of the rotation angle $\alpha$ unreliable. As it has been recognized by the inventors, such a determination of the rotation angle $\alpha$ would be particularly unreliable at low speeds, like for example below 5 Hz, at which a label is most likely to be formed. This is due the fact that the speed is calculated in function of the pulses counted in a given interval of time, and therefore the lower the speed, the lower the number of pulses, the higher the measurement error.

According to the invention instead the position is derived from the value of an angle-dependent parameter such as the amplitude of a signal generated by a Hall-effect sensor. As an alternative to Hall-effect sensors, windings capturing variations in the magnetic field may be used.

It appears clear that the invention can be applied with minimal modification of an existing optical disc drive: the measuring means 31 may be implemented as an input connected to and A/D converter in a microcontroller, whereas the calculation means 32 may be fully implemented by means of a software function.

The formation of a label can then take place by scanning the label side 14 along a spiral, in a manner similar to how user-data are recorded on the data side, or along concentric circles, so as to cover the entire label side 14. At given moments the rotation angle is determined, and the writing means are modulated accordingly, so as to form a desired label. Should the measurement and the determination of the rotation angle $\alpha$ based upon take too long to be carried out at a required frequency, the determination of the rotation angle $\alpha$ may be based upon interpolation of the most recent measurements taken. The choice of the reference point 20 and of the reference position 21 is arbitrary, and does not affect the formation of the label.

As it has been introduced above, the relationship between the parameter and the rotation angle $\alpha$ referred to in the method according to the invention can be a theoretically derived relationship. In the above-discussed case of the amplitude of a signal generated by a Hall-effect sensor, based on formulas describing electromagnetic phenomena, this can be approximated with one or more periods of a sinusoid, according to how many couples of magnetic poles are present in the magnet.

However, since this relationship can deviate significantly from the theoretically derived sinusoid, advantageously an actual relationship is experimentally constructed in a preliminary or calibration step. This preliminary step can in principle be performed once for all, since the actual relationship between the parameter and the rotation angle primarily depends on the Hall sensor, on the magnet, and on the coupling between the two, after which the experimentally constructed relationship is used each time the rotation angle is determined. In this case this calibration step may be performed by the user, prior to the first use of the apparatus, or still in the factory.

Preferably the apparatus should be provided with the capability of performing a new calibration step, should a modification of the relationship occur due to time, use, deterioration, or environmental changes. A new calibration step may be automatically generated or triggered by the user.

The relationship is constructed with the use of calibration means 33 as explained below:

The turntable motor 11 is controlled to rotate; at given moments during a revolution both the measuring means 31 and reference measuring means 35, which provide a reference measurement of the rotation angle $\alpha$, are controlled to perform a simultaneous measurement. The couple of measurements is acquired by the calibration means 33 and represents a sample of the relationship between the parameter and the rotation angle $\alpha$, i.e. it provides the rotation angle corresponding to a given value of the parameter. The procedure is repeated so as to obtain a collection of samples as dense as desired, even during several revolutions. Various techniques can be used to filter the collection of samples so as to reduce the effect of noise, as it will appear clear to those skilled in the art. The collection of samples so obtained is stored in a memory in the form of a look-up table 34. During normal operation the calculation means 32, after acquiring a value of the parameter from the measuring means 32, search in the look up table 34 for the rotation angle corresponding to the acquired value of the parameter. If the acquired value of the parameter is not present in the look-up table, an interpolation can be calculated upon samples available for values of the parameter close to the acquired one. Experiments conducted by the inventors have shown that in this way it is possible to determine the rotation angle α with a precision of a hundredth of degree.

The reference measuring means 35 may be an external device available only in the factory, which is used in a once-for-all calibration step. Such a device may be for example an angular encoder connectable to the shaft. Otherwise the reference measuring means may be an internal device, with which the optical disc drive is permanently provided.

In an advantageous embodiment the function of the measuring means is performed by use of components which are already present in an optical disc drive.

In fact, optical information carrier such as CD-ROM, CD-R, CD-RW, DVD-ROM, DVD+R or DVD+RW comprise various synchronization patterns, from which relevant synchronization signals are generated during access, which synchronization signals can be used for the purpose of carrying out the reference measurement of the rotation angle α.

A first synchronization signal is the wobble signal. In fact, a recordable optical information carrier such as CD-R, CD-RW, DVD+R or DVD+RW comprises a spiral track having a radial wobble modulation in which address information is encoded; this address information is organized in frames, known as ATIP/ADIP frames, and is used to address sectors of user data during writing. A signal derived from the wobble modulation, known as wobble signal, having a frequency which depends on the nominal wavelength and on the scanning linear speed, is normally used in the optical disc drive to regulate the rotation speed during writing. This signal can be used to provide a speed information, significantly more precise than the speed information derivable from the tacho signal 25, which integrated can be processed to yield angle information.

Another synchronization signal is represented by the ATIP/ADIP syncs. A further synchronization signal is the address information encoded in the ATIP/ADIP frames. This address information represent a form of position information along the spiral track, and can be translated into an angle, preferably taking into account possible deviations in the wavelength of the wobble and in the track pitch from the exact value specified in the relevant standard.

Yet further examples are the synchronization signals present in recorded or pre-recorded user data, like, in the case of a CD, the EFM syncs, the subcode syncs, the address information present in sectors of user data. The EFM syncs during one revolution can be counted and associated to equal angle intervals.

An even further example of synchronization signal is the clock period reconstructed by the bit detector PLL.

Anyone of these synchronization signal, or combination thereof, can be used to provide a reference measurement of the rotation angle.

Figure 4:
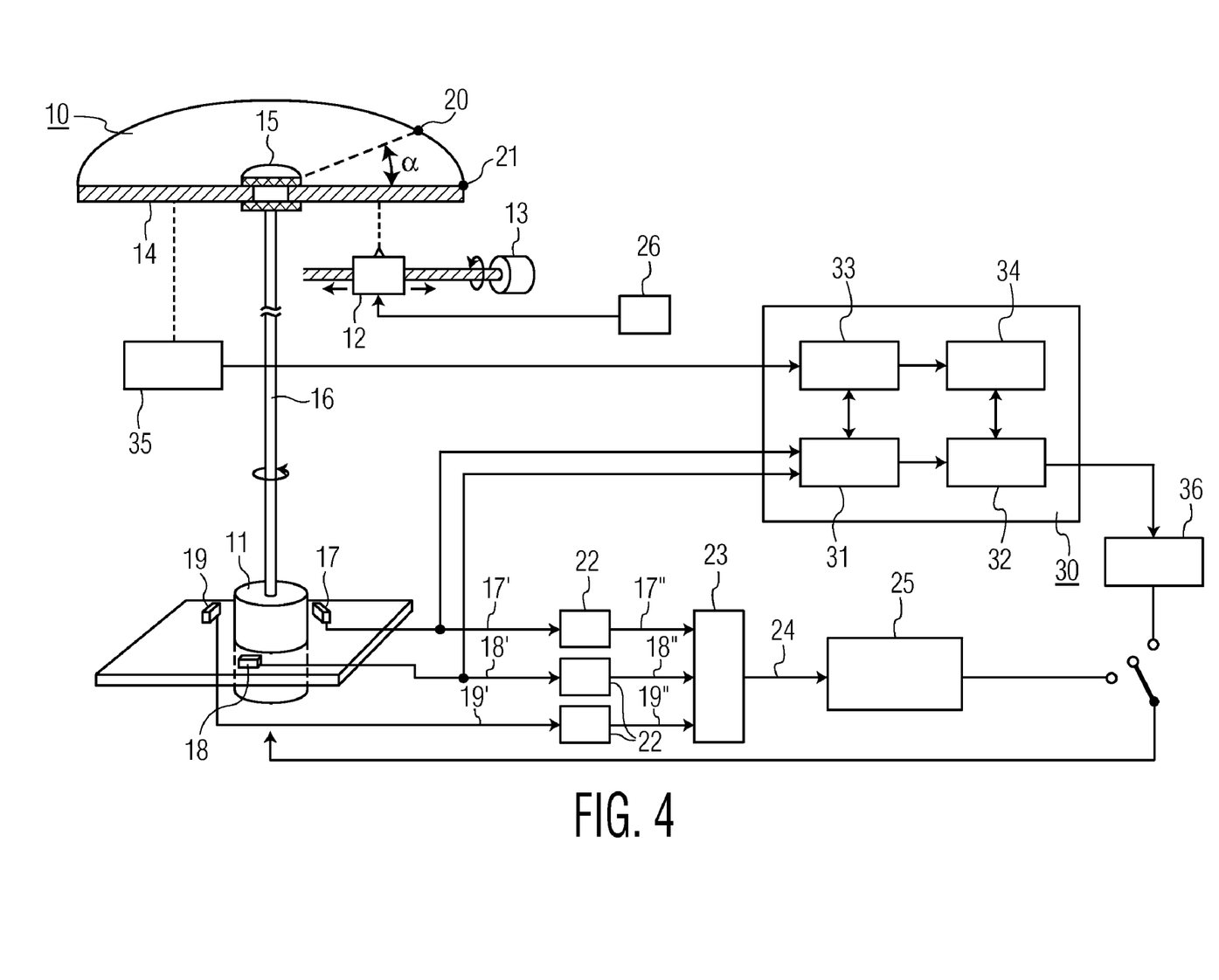
FIG. 4 shows a second embodiment of an apparatus for forming a label on a label side of an optical information carrier according to the invention.

FIG. 4 shows a second embodiment of an apparatus for forming a label on the label side 14 of an optical information carrier 10 according to the invention. In addition to features already shown in FIG. 1 and FIG. 3, a speed regulation unit 36 is present, for regulating the rotation of the optical information carrier 10 at a constant angular velocity. According to this embodiment the rotation angle α determined is provided to the speed regulation unit 36, and used for regulating the rotation speed of the turntable motor 11. In this way it is possible to achieve a regulation of the rotation speed which, at low speeds, is much more accurate than the regulation based on the tacho signal.

In this context by low speed it is meant a speed at which the regulation based on the tacho signal fails to maintain the speed constant, with a sufficient accuracy: typically this is a speed below 25Hz.

It is underlined that the speed regulation unit 36 has a functioning different from the functioning of the speed control unit 25.

The speed control unit 25 controls the motor on the basis of a number of pulses counted over a relatively large time interval. The speed value which can be so determined is nor accurate nor up-to-date. As a result, while high speeds are sufficiently stable, low speeds, which appear to be suitable during formation of a label, cannot be obtained with a sufficient stability, i.e. involving large fluctuations in the speed. The speed regulation unit 36 instead controls the turntable motor 11 on the basis of an accurate angle determination which is the more up-to-date the more frequently the rotation angle α is determined. As a result the turntable motor 11 can be controlled to finely produce a constant angular velocity, even at low speeds. Therefore the power modulation means 26 can modulate the power of the writing means 12 simply on the basis of time information, or, in other words, in dependence of a rotation angle virtually calculated by integrating the imposed constant angular velocity.

Conveniently the label can be formed at very low speeds, like for example 1-2Hz.

The embodiments presented in FIG. 3 and FIG. 4 can also be combined. For example, the rotation angle α can be used at the same time for obtaining a low constant angular velocity and for modulating the power of the writing means. Further, modulating the power of the writing means may be performed on the basis of virtually calculated rotation angle, i.e. in an open loop, wherein this virtually calculated rotation angle at given intervals is corrected according to the rotation angle α determined.

In conclusion a user may operate as follows. Prior to the first use of the apparatus for writing on a label side 14 of an optical information carrier 10, an optical information carrier like for example a CD-R is inserted in the apparatus, with the data side facing the head which is used for accessing the optical information carrier, so as to enable the preliminary step to be carried out, and the relationship to be constructed. Then the optical information carrier 10 having the label side 14 to be written is inserted, with the label side 14 facing the writing means 12, so as to enable the formation of the label. The optical information carrier used for experimentally constructing the relationship in the preliminary step, may be the same optical information carrier 10 which label is then formed, or a different one. As already introduced, this preliminary step may be performed once for all prior to the first use, or may be repeated subsequently when necessary.

Although the invention has been elucidated with reference to an optical information carrier, it will be evident that other applications are possible, for example to a rotatable non-optical information carrier. The scope of the invention is therefore not limited to the embodiments described above.

It must further be noted that the term "comprises/comprising" when used in this specification, including the claims, is taken to specify the presence of stated features, integers, steps or components, but does not exclude the presence or addition of one or more other features, integers, steps, components or groups thereof. It must also be noted that the word "a" or "an" preceding an element in a claim does not exclude the presence of a plurality of such elements. Moreover, any reference signs do not limit the scope of the claims; the invention can be implemented by means of both hardware and software, and several "means" may be represented by the same item of hardware. Furthermore, the invention resides in each and every novel feature or combination of features.

The invention can be summarized as follows. In an optical disc drive, adapted for forming a label on the label side of a recordable optical disc, a determination of the rotation angle is provided, so that the marking of the label side can be synchronized upon. The method to determine the rotation angle is based upon one or two of the signals generated by the Hall-effect elements which are normally present in an optical disc drive and are used to generate the tacho signal. Advantageously, the actual relationship between rotation angle and the amplitude of these signals is recorded in a calibration procedure, so as to allow for a higher precision of the rotation angle determined. This calibration procedure may be performed in the factory or by the user, and may not require any additional ad-hoc equipment if a synchronization pattern present in the optical disc is used to provide a reference measurement of the rotation angle.

The invention claimed is:

1. A method for forming a label on a label side (14) of an optical information carrier (10) engaged by a turntable motor (11) in an optical disc drive, comprising:
    rotating the optical information carrier;
    determining a rotation angle ($\alpha$) of the optical information carrier by measuring a parameter, which parameter varies continuously in dependency of the rotation angle, and calculating the rotation angle by using a relationship between the parameter and the rotation angle; and
    modulating the power of writing means (12) for marking the label side while rotating the optical information carrier, the modulating being dependent on the rotation angle determined.

2. A method for forming a label on a label side (14) of an optical information carrier (10) engaged by a turntable motor (11) in an optical disc drive, comprising:
    rotating the optical information carrier;
    determining a rotation angle ($\alpha$) of the optical information carrier by measuring a parameter, which parameter varies continuously in dependency of the rotation angle, and calculating the rotation angle by using a relationship between the parameter and the rotation angle;
    using the rotation angle determined to regulate the rotating of the optical information carrier; and
    modulating the power of writing means (12) for marking the label side while rotating the optical information carrier.

3. A method as claimed in claim 2 wherein the optical information carrier is rotated at a constant angular velocity.

4. A method as claimed in claim 1 or 2, wherein in a preliminary step the relationship between the parameter and the rotation angle ($\alpha$) is constructed by:
    rotating the turntable motor (11);
    measuring the parameter; and
    carrying out a reference measurement of the rotation angle.

5. A method as claimed in claim 4, wherein in the preliminary step an optical information carrier having a synchronization pattern is rotated by the turntable motor 11, and a synchronization signal generated from the synchronization pattern is used for carrying out the reference measurement of the rotation angle ($\alpha$).

6. A method as claimed in claim 1 or 2, wherein:
    in determining the rotation angle ($\alpha$) a further parameter, which varies continuously in dependency of the rotation angle, is measured; and
    in calculating the rotation angle a relationship between the parameter and the further parameter on one hand and the rotation angle on the other hand is used as the relationship.

7. A method as claimed in claim 1 or 2, wherein in determining the rotation angle ($\alpha$) a signal (17') generated by a Hall-effect sensor (17) is measured as the parameter, which Hall-effect sensor is rotating relative to a magnetic field upon rotation of the turntable motor (11).

8. An apparatus for forming a label on a label side (14) of an optical information carrier (10), comprising:
    a turntable motor (11) for rotating the optical information carrier;
    an angle determination unit (30) for determining a rotation angle ($\alpha$) of the optical information carrier, the angle determination unit comprising measuring means (31) for measuring a parameter, which varies continuously in dependency of the rotation angle, and calculation means (32) for calculating the rotation angle, by using a relationship between the parameter and the rotation angle;
    writing means (12), for marking the label side; and
    power modulation means (26) for modulating the power of the writing means while rotating the optical information carrier, adapted for modulating the power of the writing means in dependency of the rotation angle determined.

9. An apparatus for forming a label on a label side (14) of an optical information carrier (10), comprising:
    a turntable motor (11) for rotating the optical information carrier;
    an angle determination unit (30) for determining a rotation angle ($\alpha$) of the optical information carrier, the angle determination unit comprising measuring means (31) for measuring a parameter, which varies continuously in dependency of the rotation angle, and calculation means (32) for calculating the rotation angle, by using a relationship between the parameter and the rotation angle;
    a speed regulation unit (36) for regulating the rotation of the optical information carrier by using the rotation angle determined;
    writing means (12), for marking the label side; and
    power modulation means (26) for modulating the power of the writing means while rotating the optical information carrier.

10. An apparatus as claimed in claim 9, wherein the speed regulation unit (36) is adapted for regulating the rotation of the optical information carrier (10) at a constant angular velocity.

11. An apparatus as claimed in claim 8 or 9, further comprising calibration means (33) for constructing the relationship between the parameter and the rotation angle ($\alpha$), the calibration means being capable of:
    controlling the turntable motor (11) to rotate;
    controlling the measuring means (31) to measure the parameter, and acquiring the parameter measured; and
    controlling reference measuring means (35) to carry out a reference measurement of the rotation angle, and acquiring the reference measurement.

12. An apparatus as claimed in claim 8 or 9, further comprising a Hall-effect sensor (17) for generating a signal (17'), which Hall-effect sensor is rotating relative to a magnetic field upon rotation of the turntable motor (11), the measuring means (31) being able to measure the amplitude of the signal as the parameter.

* * * * *